United States Patent [19]
Chien

[11] 3,810,997

[45] May 14, 1974

[54] TREATMENT OF SOYBEANS WITH YEAST

[75] Inventor: Hwei-Chiu Chien, Northbrook, Ill.

[73] Assignee: Kraftco Corporation, New York, N.Y.

[22] Filed: Oct. 7, 1971

[21] Appl. No.: 187,567

[52] U.S. Cl.................... 426/205, 426/49, 426/188, 426/190
[51] Int. Cl................................................ A23l 1/20
[58] Field of Search............ 99/14, 117, 17, 57, 96, 99/98

[56] References Cited
UNITED STATES PATENTS

| | | | |
|---|---|---|---|
| 2,809,113 | 10/1957 | Stimpson et al. | 99/9 |
| 3,364,034 | 1/1968 | Hoersch et al. | 99/98 |
| 1,082,118 | 12/1913 | Gossel | 99/64 |

FOREIGN PATENTS OR APPLICATIONS

| | | |
|---|---|---|
| 1,193,135 | 5/1970 | Great Britain |

*Primary Examiner*—David M. Naff
*Attorney, Agent, or Firm*—Fitch, Even, Tabin & Luedeka

[57] ABSTRACT

A method for treating a vegetable material containing protein is provided. In the method, an aqueous dispersion containing protein is prepared. The aqueous dispersion is then treated to provide a substrate that is relatively free from microbiological contamination. A viable culture of a particular yeast or mixture of yeasts is then added to the substrate. The yeast is selected so as to be capable of utilizing the carbohydrate material found in the vegetable protein source. Fermentation of the inoculated substrate is then effected under conditions which minimize production of alcohol.

8 Claims, No Drawings

TREATMENT OF SOYBEANS WITH YEAST

The present invention relates generally to a method for treatment of a vegetable protein material so as to improve the flavor thereof. More particularly, the present invention is directed to a method for treating soy bean materials with a yeast material so as to improve the flavor thereof. The invention is also directed to the use of the improved soy bean material in food products.

Protein derived from vegetable seeds and other vegetable components, such as soy beans, sesame seeds, cotton-seed, alfalfa or other protein-containing green plants, is a potentially valuable source of protein for human consumption. However, various vegetable proteins have found limited use in human foods due to the unpalatable taste of the vegetable protein. For example, the characteristic taste associated with soy beans is generally described as being "beany" and the taste is considered essentially unpalatable to humans. Consequently, soy bean materials have had limited use in human diets. A further problem with respect to the use of various vegetable protein sources in foods intended for human consumption is that the carbohydrate materials found in various vegetable proteins are not readily assimilated and utilized by the human digestive system.

Numerous methods have been proposed for treating vegetable protein materials so as to improve the flavor and provide the vegetable protein in a more desirable form for human use. However, none of these proposed processes have been fully satisfactory in that the vegetable protein may retain a residual unpalatable taste or the process may be so complex and costly as to be uneconomical.

Accordingly, it is a principal object of the present invention to provide a method for treating vegetable protein materials so as to improve the taste thereof. It is another object of the present invention to provide a method for treating vegetable protein materials so as to increase the protein content thereof and to utilize such treated vegetable protein materials in food products. It is a further object of the present invention to provide a method for treating particular vegetable protein materials, such as soy beans, so as to improve their flavor, reduce the carbohydrate content and increase the protein content thereof. It is a still further object of the present invention to provide food products with vegetable protein materials treated in accordance with the invention.

These and other objects of the present invention will become more apparent from the following detailed description and the accompanying claims.

In accordance with various features of the present invention, an aqueous dispersion of a ground vegetable material containing protein and carbohydrates is first prepared. The aqueous dispersion is then treated to provide a substrate that is relatively free from microbiological contamination. A viable culture of a particular yeast or mixture of yeasts is then added to the substrate. The yeast is selected so as to be capable of utilizing at least a portion of the carbohydrate materials found in the vegetable protein source. Fermentation of the inoculated substrate is then effected under conditions which minimize production of alcohol. As used herein, the term "fermentation" refers to the process of effecting yeast growth under conditions which substantially inhibit production of alcohol. It is generally desirable to conduct the fermentation under aerobic conditions. Aerobic conditions generally suppress alcohol formation. After the fermentation is completed, the substrate is subjected to heat treatment sufficient to inactivate the yeast culture. The fermented substrate may then be further treated so as to recover the vegetable protein source and the yeast from the substrate.

During the fermentation step, the yeast utilizes a portion of the carbohydrate materials in the vegetable protein source and the yeast culture multiplies. The total protein of the system increases due to conversion of carbohydrates to yeast, which is substantially proteinaceous in composition. When the method of the present invention is used to treat a soy bean vegetable protein, it is a surprising result that the beany taste of the soy bean is removed and a bland tasting finished product is obtained. Both the soy bean vegetable protein material and the yeast have unpalatable taste associated therewith. It is, therefore, a surprising and synergistic effect that a bland tasting finished product is obtained as a result of the treatment.

The present invention will hereinafter be described in further detail with particular reference to the treatment of soy beans. However, it should be recognized that the method of the present invention for treating vegetable protein sources is equally suitable for a variety of vegetable protein materials. This is so, even when the vegetable protein source has a desirable flavor associated therewith. Since the treatment of the present invention of a vegetable protein source results in an increase in protein of the finished product, the treatment is valuable even when the vegetable protein source has a desirable flavor without such treatment.

The yeast may be any yeast which utilizes the carbohydrate of the soy bean. Particularly preferred yeasts are S. cervisiae, S. fragilis, S. carlsbergensis, Candida utilis, Candida tropicalis or mixtures thereof. While not wishing to be bound by any theory, it is believed that the utilization of the carbohydrate by the yeast during growth of the yeast is not particularly responsible for the improvement in flavor which is obtained. It is believed that enzymes which are present during yeast metabolism in some way influence the unpalatable flavor characteristics of the soy bean. It is not known why the yeast itself contributes little if any flavor to the finished product, but it is believed that some interaction between the components of metabolism of the yeast and the components or modified components of the soy bean occurs which influences the flavor of the yeast material which is produced.

It is preferred that the soy bean protein be in the form of a soy flour for use in the process of the invention. Any type of soy flour may be used. In this connection, full-fat, low-fat and defatted soy flour may be used.

Full-fat soy flour contains all the fat originally present in the soy bean seed. Low-fat soy flour is made from the pressed cake obtained from a continuous screw-press method of removing oil from soy bean seed. Defatted soy flour is made from flakes obtained by the solvent extraction of oil from soy bean seed. All soy flour materials are prepared from de-hulled soy beans. In general, the three types of soy bean flours described above have the following composition:

| Component | Solvent-extracted soy flour | Full-fat soy flour | Low-fat soy flour |
| --- | --- | --- | --- |
| Moisture | 12.0 max. | 8.0 max. | 8.0 max. |
| Protein | 44.0 min. | 40.0 min. | 50.0 min. |
| Carbohydrate* | 7.0 max. | 3.0 max. | 3.5 max. |
| Fat | 0.5 min. | 18.0 min. | 2.0 max. |
| Ash | 6.0 max. | 5.5 max. | 6.5 max. |

*Mainly sucrose, raffinose, stachyose and pentosans

As indicated, the soy bean material useful for the present invention may be any soy flour. The soy flour should have a particle size sufficiently small so that a dispersion of the soy flour may be provided. However, the particle size and particle size distribution of the soy flour is not critical and any particle size that may be uniformly dispersed in an aqueous fluid without substantial settling is suitable. In general, it is desired that the soy flour be provided at a level of from about 1 percent to about 40 percent in the dispersion, although the level present is not critical.

Thereafter, the soy bean dispersion is treated to reduce the level of naturally occurring microorganisms. Such treatment may consist of heating to effect pasteurization or by other suitable means, such as the addition of suitable chemicals, such as hydrogen peroxide. Generally, heat treatment at a temperature of about 150°F for about 5 minutes or other equivalent time-temperature is sufficient to effect pasteurization.

A viable culture of yeast is then added to the aqueous dispersion of soy flour. As indicated, the yeast is selected so as to be capable of metabolizing the carbohydrate content of soy flour. The fermentation is conducted in a manner so as to minimize production of alcohol by the yeast during the fermentation. It is preferred that the yeast be selected from the Saccharomyces genus. Particularly preferred yeast are the species cervisiae, lactis, fragilis and carlsbergensis of the Saccharomyces genus.

The yeast culture is added to the soy flour dispersion at a level such that the fermentation may be effected in a reasonably short period of time, preferably from about 2 to about 8 hours. The yeast culture is preferably added at a level of from about 0.1 percent to about 2.0 percent (dry yeast basis) based upon the level of soy protein solids in the aqueous dispersion. The level of addition of the yeast is not critical, but does influence the time required to effect the fermentation. The rate of fermentation may also be increased by the addition of minor amounts of known, inorganic yeast nutrient materials, such as ammonium sulphate and potassium phosphate.

During the fermentation, yeast protein is produced and in general about one-half percent of yeast protein is produced for each 1 percent of soy bean carbohydrate that is utilized. The final product may have a protein level of from about 55 to about 65 percent (fat free basis) of which about 2–4 percent is yeast protein. The fermentation will generally be complete in a period of about 2 to 8 hours when the fermentation is conducted at a temperature of from between about 70°F and about 104°F.

Aerobic fermentation conditions are maintained by agitating the inoculated soy flour dispersion with air. Such aerobic conditions promote yeast growth and minimize production of alcohol. In general, it is desired that the alcohol produced during the fermentation step be less than about 0.5 percent by weight based on the weight of soy protein present in the dispersions.

After the fermentation has proceeded to a desired level, the aqueous disperson of soy flour and yeast is based so as to inactivate the yeast. A suitable temperature and time for inactivation of the yeast is 160°F for 15 seconds or 170°F for no hold time. Other equivalent time and temperature conditions may be used. If desired, the aqueous dispersion of soy flour and yeast may be further heat treated at higher temperatures for longer periods of time so as to remove anti-tryptic factors found in the soy material. However, such further heat treatment is optional, and is not required for the method of the invention. A suitable heat treatment to remove anti-tryptic factors is 200°F for one-half hour.

After pasteurization, the aqueous dispersion of soy flour and yeast is ready to be used. However, it will usually be found desirable to concentrate the dispersion prior to use. Also, the dispersion may be dried, acid precipitated, or otherwise treated so as to remove a substantial level of the water of the dispersion.

The treated soy flour may be used to provide various products. A vegetable milk may be prepared by combining the treated soy flour with a suitable fat and adjusting the fat, protein and water content to substantially that of bovine milk. The treated soy flour may also be used in the manufacture of natural or process cheese.

In this connection, in the manufacture of natural cheese the treated soy flour is made into a suitable media by adding the soy flour to water and adjusting the fat content and protein content to provide a medium which produces a curd having a protein and fat content which is associated with the particular cheese to be made. It has been found that at least about 15 percent of the protein of the medium should be provided by a bovine milk. The presence of bovine milk is desirable to provide suitable coagulation properties when the medium is treated by the cheese make process to provide a natural cheese.

The treated soy flour may also be used to replace part of the protein provided by natural cheese used in the manufacture of process cheese, cheese food, or cheese spread. As used herein, the term "process cheese" refers to cheese which is made by grinding and mixing together, with heating and stirring, one or more natural cheeses of the same or two or more varieties. An emulsifying agent is added to the mixture and the mixture is worked into a homogeneous, plastic mass. Various acids may be added, such as lactic acid, citric acid, acetic acid, phosphoric acid or vinegar. The moisture level of process cheese generally does not exceed about 40 percent and process cheese has a minimum fat level of about 50 percent on a dry basis.

The term "cheese food" refers to a cheese product which is prepared generally from the same materials, and the procedure indicated above for process cheese. However, cheese food may have optional dairy ingredients added thereto, such as cream, milk, skim milk, whey or any of these from which part of the water has been removed. The moisture level of cheese food is generally higher than that of process cheese, and may be up to about 44 percent. The fat is at least about 23 percent but is usually less than 50 percent.

The term "cheese spread" refers to a cheese product which is generally similar to cheese food products but may have a moisture level of up to 60 percent. The minimum fat level for cheese spread is about 20 percent.

As indicated, the treated soy flour of the invention may be used for part of the protein usually provided by natural cheese which is utilized in the manufacture of process cheese, cheese food and cheese spread. In this connection, the mixture of treated soy flour and natural cheese is adjusted so as to have substantially the same protein, fat and water content associated with the process cheese, cheese food or cheese spread. The treated soy flour is used to replace up to about 60 percent of the protein usually provided by natural cheese without any substantial changes in flavor, texture of mouth feel in the finished product.

The following examples further illustrate various features of the present invention, but are intended to in no way limit the scope of the invention, which is defined in the appended claims.

EXAMPLE I

Defatted soy flour, which had been produced by a solvent extraction process, was dispersed in water to provide an aqueous dispersion having 10 percent soy flour. The particular soy flour used is available from Archer, Daniels, Midland Co. under the tradename Nutrisoy 7B. The aqueous soy flour dispersion was then pasteurized by heating the dispersion to a temperature of 160°F for a period of five minutes. Thereafter, a viable culture of *Saccharomyces cervisiae* yeast was added to the aqueous dispersion of the soy flour. The yeast culture had 3 percent yeast solids in an aqueous dispersion and 2 percent by weight based on the weight of the aqueous dispersion of the yeast culture was added. 0.4 percent of ammonium sulphate and 0.1 percent of potassium phosphate (dry basis), based on the weight of the aqueous dispersion, were added.

The inoculated soy flour dispersion was then fermented for a period of four hours at 86°F. The aqueous dispersion was air agitated during the fermentation. At the end of the fermentation, the carbohydrate and alcohol content of the dispersion on a dry basis was determined. It was found that the soy flour dispersion had 0.08 percent alcohol by weight.

The aqueous soy flour dispersion was then heated to a temperature of 170°F for no hold time so as to pasteurize the dispersion and inactivate the yeast. The dispersion was then treated with acid to precipitate the protein and was dried to provide a dry soy flour material. The soy flour material had 64 percent protein of which approximately 3 percent was determined to have been contributed by the yeast.

EXAMPLE II

The treated soy flour obtained by the procedure of Example I was used to prepare a vegetable milk. The vegetable milk was prepared by adding 5 pounds of the treated soy flour to 95 pounds of water. The mixture was stirred until the soy flour was dispersed in the water. Four pounds of coconut fat having a melting point of 92°F was heated in a separate container until fluid. The coconut fat was added under conditions of rapid agitation so as to provide a loose emulsion.

The mixture of soy flour, coconut fat and water was then pasteurized at a temperature of 160°F for five minutes and was passed through a homogenizer at 2,500 psi single stage. A bland tasting soy flour beverage was obtained which had none of the characteristic beany flavor usually associated with soy flour.

EXAMPLE III

Natural cheese was produced using the vegetable milk from Example II. The soy flour vegetable milk of Example II was combined with bovine milk at a ratio of 40 parts of soy flour milk to 60 parts of bovine milk. The resultant mixture was utilized as a medium for the manufacture of Cheddar cheese in accordance with a conventional Cheddar cheese make process. The finished cheese was cured for a period of six months and the Cheddar cheese product obtained had a typical Cheddar cheese taste, texture and mouth feel.

EXAMPLE IV

The treated soy flour of Example I was used in the manufacture of cheese food. The treated soy flour was combined with coconut fat and water, as previously described in Example II, to provide a medium having 28 percent soy flour, 32 percent coconut fat and 40 percent moisture. The soy flour medium was used in the manufacture of cheese food having the following formulation:

| Ingredients | Weight Percent |
|---|---|
| Natural cheese (aged 6 months) | 64.8 |
| Soy flour medium | 6.5 |
| Non-fat dry milk (dry basis) | 6.4 |
| Whey solids | 8.5 |
| Water | 10.0 |
| Sodium chloride | 0.6 |
| Emulsifying salts | 3.2 |

The cheese food formulation was made using a conventional lay-down cheese cooker. Part of the natural cheese was placed in the cooker and the sodium chloride and emulsifying salts were added thereto. The cheese was heated and stirred until fluid, and thereafter the balance of the natural cheese and the soy flour medium was added thereto. The non-fat dry milk and whey solids were combined with water and were thereafter added to the mixture in the cheese cooker. The mixture was then stirred and heated by steam injection to provide a fluid, homogeneous cheese food formulation. The cheese food formulation was then packaged into 1 lb. loaves by pouring the cheese food formulation into lined packages.

The cheese food product obtained by the above method was compared with a cheese food product made entirely with natural cheese. No substantial differences in taste, texture of mouth feel were noticed.

What is claimed is:

1. A method for treating soybeans so as to improve the flavor thereof consisting essentially of the steps of providing an aqueous dispersion consisting essentially of water and soybean flour, said soybean flour being present in said dispersion at a level of from about 1 percent to about 40 percent by weight, treating said dispersion to reduce the level of microorganisms present, inoculating said dispersion with yeast, said yeast being selected from the group consisting of Saccharomyces cervisiae, Saccharomyces lactis, Saccharomyces fragilis, Saccharomyces carlsbergensis, Candida utilis, Candida tropicalis and mixtures thereof and fermenting said inoculated dispersion, said fermentation being effected under aerobic conditions which minimize production of alcohol.

2. A method in accordance with claim 1 wherein said yeast is added to said dispersion at a level of from about 0.1 percent to about 2 percent by weight, dry yeast basis, based upon the level of vegetable protein source in said dispersion.

3. A method in accordance with claim 1 wherein said treatment to reduce the level of organisms is a pasteurization heat treatment.

4. A method in accordance with claim 1 wherein said yeast is inactivated after said fermentation.

5. The product of the process of claim 1 containing from about 55 to about 65 percent protein of which from about 2 to about 4 percent is yeast protein.

6. A milk-like product comprising protein, fat and water wherein at least part of said protein is the product in accordance with claim 5.

7. Process cheese, cheese food or cheese spread comprising natural cheese and the product in accordance with claim 5.

8. Process cheese, cheese food or cheese spread in accordance with claim 7 wherein said product is present at a level sufficient to provide from about 5 percent to about 60 percent of the protein.

* * * * *